United States Patent [19]

Nagorny

[11] 4,428,581
[45] Jan. 31, 1984

[54] TRI-DIMENSIONAL PUZZLE

[76] Inventor: Gabriel Nagorny, 21 rue du Marechal Vaillant, 130 Nogent-sur-Marne, France

[21] Appl. No.: 274,169

[22] Filed: Jun. 16, 1981

[30] Foreign Application Priority Data

Jun. 19, 1980 [FR] France ............................... 80 13578
Nov. 19, 1980 [FR] France ............................... 80 24515

[51] Int. Cl.³ .............................................. A63F 9/08
[52] U.S. Cl. ................................................ 273/153 S
[58] Field of Search ....................... 273/153 S, 157 A; 46/24

[56] References Cited

U.S. PATENT DOCUMENTS

| 230,947 | 8/1880 | Kellogg | 273/153 S |
|---|---|---|---|
| 416,344 | 12/1889 | Rice | 273/153 S |
| 785,665 | 3/1905 | Coe | 273/153 S |
| 3,774,332 | 11/1973 | Schneider | 46/24 X |
| 3,845,959 | 11/1974 | Kosarek | 273/153 S |
| 4,036,503 | 7/1977 | Golick | 273/153 S |
| 4,257,609 | 3/1981 | Squibbs | 273/157 A |

FOREIGN PATENT DOCUMENTS

| 348943 | 2/1922 | Fed. Rep. of Germany | 273/153 S |
|---|---|---|---|
| 170062 | 12/1977 | Hungary | 273/153 S |

Primary Examiner—Anton O. Oechsle
Attorney, Agent, or Firm—Cushman, Darby & Cushman

[57] ABSTRACT

The present invention concerns a tridimensional puzzle comprising elements movable by gravity within a volume limited by the walls of a box. It comprises, more specifically, on the one hand, n identical parallelepipedic elements and, on the other hand, a transparent parallelepipedic box the sides of which are multiples of the sides of one element and the volume of which is roughly equal to that of $n+1$ elements, the volume of one element left vacant in the box allowing the displacement of at least some of the elements and the value of the multiples being such that at least two of the n elements do not come into contact with edge of the box.

6 Claims, 6 Drawing Figures

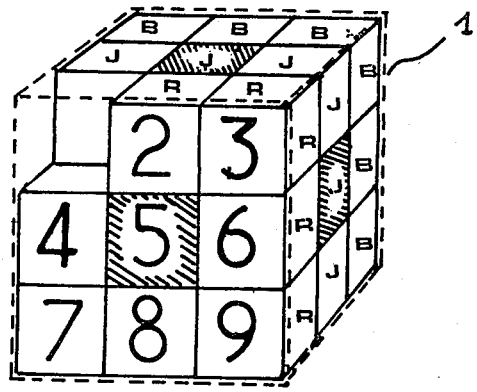
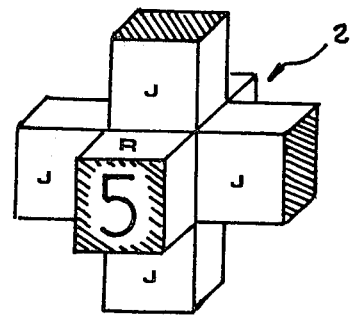
fig. 1　　　　　fig. 2
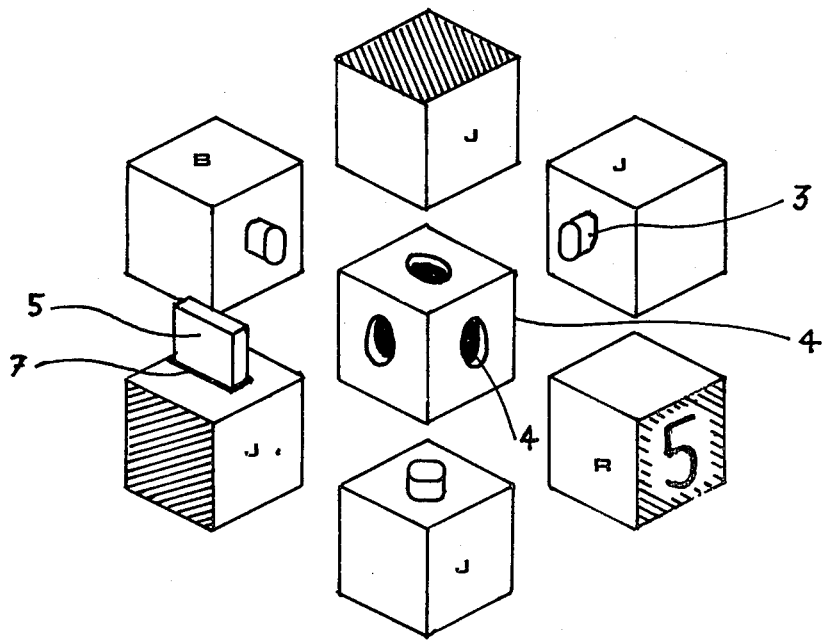
fig. 3

TRI-DIMENSIONAL PUZZLE

BACKGROUND OF THE INVENTION

The principle of the bi-dimensional puzzle called "figure-slide puzzle", invented in 1873 by Sam Lloyd is known, wherein numbered squares can slide one with respect to another within a rectangular frame. These squares fill the frame except for the space of one which is left empty and so allows the order of the numbers to be modified by sliding one with respect to the others by pushing them with a finger. The game consists in repositioning the squares in numerical order after having jumbled their order beforehand.

The purpose of the present invention is to give an additional dimension to the above-mentioned puzzle by the production of a tridimensional puzzle.

The most remarkable attempt at the production of a tri-dimensional figure-slide puzzle up to the present time is the one given in U.S. Pat. No. 3,845,959 filed by D. KOSAREK on Nov. 14, 1973. The solution described in the patent comprises twenty-six cubes enclosed in a plastic cubic box, with nine holes in each side.

The position of the cubes can be changed by inserting fingers into the holes, which enables the cubes to be reached and moved thanks to the empty space left by the absence of a twenty-seventh cube. This embodiment requires a box with relatively thick walls for it to be sufficiently rigid which makes difficult the insertion of fingers into the holes to move the cubes. Moreover, the cubes at the center of each side of the box are very difficult to move for, in order to displace them, two cubes along one of the edges of the box must first of all be set aside. The cube at the center of the box is still more difficult to move.

SUMMARY OF THE INVENTION

The aforesaid difficulties are eliminated by the present invention as in the puzzle it proposes the elements are moved solely by gravity, and the person playing the game does not touch the elements.

For this purpose, only the elements along the edges of the box are free to be moved, the other elements together forming a unit structure which immobilizes them.

DESCRIPTION OF THE PREFERRED EMBODIMENTS

In most cases, the unit structure is in the form of a tridimensional cross made up of the elements that are not in contact with the edges of the box.

If gravity is to be used to move the elements in the box, the possible paths that can be taken must be unambiguously defined.

This condition requires that the displacement of the elements be solely along the edges of the box, by keeping fixed the element or elements at the center of each of the sides of the box.

In a preferred embodiment the elements are cubes as in the box although this is not necessary for the box.

According to a very satifactory embodiment of the invention, the cubic box contains nineteen mobile cubes and, as a unit structure, a tridimensional cross composed of the six cubes at the center of each of the sides and the cube at the center of the box.

The unit structure may be produced as a rigid block and the elements comprising it may be, for instance, glued together, or in the form of a loose assembly of elements.

In the latter case, which is the preferable one, the elements forming the unit structure are assembled together by means of positioning stubs provided on some of these elements which fit into holes provided in the adjacent elements.

To facilitate the sliding of these elements with respect to each other, the edges of the elements are rounded and there is play between all of the fixed or mobile elements and the walls of the box.

Preferably, the box is made of two identical half-boxes with edges, at an angle of 45° with respect to the sides of the box, assembled by glueing. In this way only one mold will be needed for casting the half-boxes and obtaining the completed box by assembling them together. The area to be glued is large and ensures proper stiffness of the box when assembled. During construction, it is easy to fill the box manually with the cubes by piling all of them into one of the half-boxes and then adding the other half box.

As the player does not touch the elements but just tilts the box in such a way as to move them, the walls of the box can be solid. Thus the elements are in an enclosed housing.

Thanks to the space left by the absence of one element and the clearance existing between the elements and the walls of the box, the aforesaid elements are very easily moved when the box is tilted.

To keep the elements in a solved position of the puzzle, for instance, to ensure a uniform presentation of the puzzle for sale, it is desirable to have the elements immobilized.

For this purpose, the puzzle comprises a blocking part that, when the empty space provided for the displacement of the elements is just under an appropriate opening made in the box, can be inserted into the said opening to fill the empty space and fit into a housing provided in the fixed cube below the aforesaid opening.

In a preferred embodiment of the invention, the elements or their sides are of different colors or bear different symbols giving them a specific location in the box.

These symbols can be figures, letters, or fragments of an image etc.

In another embodiment the elements have a transparent portion and an opaque portion assembled in such a way that an object in volume form appears through the transparent portion of the elements and the walls of the box.

Other features and advantages of the present invention will appear from the description which follows, reference being made to the attached drawings wherein:

FIG. 1 is a perspective view of one of the embodiments of the invention,

FIG. 2 illustrates the unit structure,

FIG. 3 illustrates a loose assembly of the unit structure,

Figure 4:
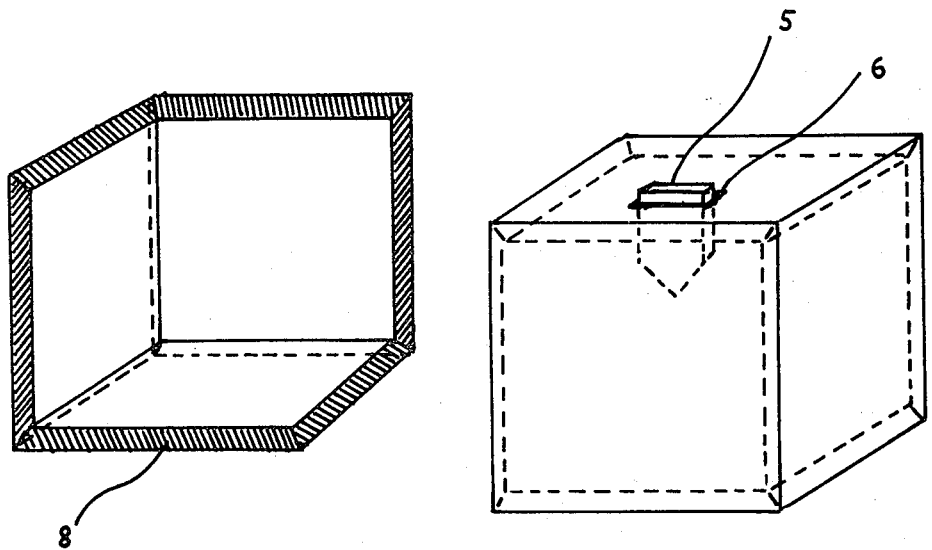
FIG. 4 illustrates a way of producing the box by means of two identical half-boxes, one of which is fitted with means for blocking the elements.

In the embodiment illustrated in FIG. 1, the puzzle is composed of twenty-six identical cubes, made of wood or plastics, in three different colors; there are nine blue cubes (B), nine yellow cubes (J) and eight red cubes (R). These cubes are enclosed in a transparent plastic box 1 thick enough to be almost impossible to distort.

The blue cubes (B) bear the numbers 1 to 9 on the side which is visible through one of the walls of transparent box 1.

The yellow cubes (J) are unnumbered. The red cubes (R) bear the numbers 2 to 9 and are visible through the transparent wall opposite the blue cubes (B).

FIG. 1 illustrates the arrangement of the blue (B), yellow (J) and red (R) cubes once the puzzle has been solved.

A space for red cube (R) 1 is left empty. This empty space will allow the mobile cubes, when the box 1 is successively tilted, to be moved in three dimensions and modify their relative location.

The missing cube could also be yellow (J) in which case the set of blue cubes (B) and red cubes (R) would then be complete and each would be comprised of nine bearing the numbers "1" to "9".

The puzzle comprises seven cubes fixed with respect to the box, these fixed cubes being marked by cross hatching thereon, and 19 mobile cubes. The seven fixed cubes are at the center and form a tri-dimensional structure (2) with a central cube and six peripheral cubes on the six sides of the central cube (FIG. 2). Two cubes joined to the two opposite sides of the central cube are respectively blue (B) and red (R) and have the number "5" on the outside. The fixed cubes on the other four sides of the central cube are yellow ("J") and unnumbered.

The purpose of central cross 2 is to direct the displacement of the mobile cubes along the edges of box 1 and to determine the color of the cubes to be brought to this side. Central cross 2 does not have a side attached to the wall of box 1. It is free in the box with a certain clearance with respect to the internal sides of the said box 1 to facilitate the sliding of the cubes with respect to each other. In order that the two cubes that are slid on the three cubes located on a lower level may slide easily, it is important that these three cubes be located at exactly the same level. This implies that central cross 2 will rest, by gravity, on the lower side of box 1 just like the mobile cubes. Therefore it must be free in the box within the clearance between the set of cubes and the internal sides of the box. Such clearance must be the equivalent of about one-tenth of the length of the edge of a cube to ensure easy sliding of the mobile cubes.

Also, to facilitate such sliding, the twelve edges of each cube are rounded to a quarter circle with a radius of about one-tenth of the length of an edge.

Several embodiments of central cross 2 are possible. One consists in making a cross in one piece either by glueing the six cubes to the sides of the central cube, or by molding in a cross-shaped mold.

Another more interesting embodiment consists in making cross 2 without any rigid connection between the seven cubes that compose it.

FIG. 3 illustrates the way of assembling these cubes. Each of the six peripheral cubes has, on one of its sides, a cylindrically shaped stub 3, which fits into one of the six holes 4, forming a housing, in the central cube, the holes being somewhat large. There is sufficient clearance between stub 3 and corresponding housing 4 to enable stub 3 to slide freely. The sole condition which is to be respected is that the length of stub 3 be greater than all the clearance between the cubes and the wall of box 1, so that the cubes of cross 2 are correctly positioned at the center of each of the sides of box 1. The location of holes 4 and projection 3 may be reversed; the central cube may be provided with stubs 3 and the six cubes with the corresponding holes 4.

The production of cross 2 by loose joining of the central cube and the peripheral cubes is doubly advantageous. On the one hand, it improves the sliding of the cubes with respect to each other, as all the cubes in the box are identical; on the other hand, only a single mold corresponding to the basic cube is needed to cast the cubes.

A simple means may be provided to block the cubes and avoid jumbling of the puzzle during transport thus delivering it for sale in the solved position of the puzzle. This blocking means also has the advantage of presenting a game comprising a complete set of blue (B) and red (R) cubes as it is placed where a yellow cube is missing between red cube "1" and blue cube "3".

FIGS. 3 and 4 illustrate this blocking means. It is a flat part 5 the width of a cube capable of being inserted into slot 6 provided on the upper side of box 1, the bevelled end portion thereof penetrating into a groove 7 provided in one of the fixed yellow cubes. Thus the empty space is filled up. This flat part 5, yellow in color, symbolizes the missng cube and serves to immobilise the set of mobile cubes when the puzzle has been solved. The height of this part 5 is such that, when fully home, it is flush with the upper side of the box and enables the puzzle to be easily packed in a cardboard box. It can be extracted without any problem by turning box 1 upside down.

FIG. 4 illustrates the make up and assembly of box 1 in transparent plastic. Box 1 is composed of two identical half-boxes cast by molding and then glueing them together. Each trihedral-shaped half-box makes up three sides of the completed box 1. The edges 8 of each half-box are inwardly inclined at an angle of 45° in such a way that the two identical half-boxes may be glued together by their inclined edges 8. The surface to be glued is shown by means of cross hatching on the left hand side of FIG. 4. The thickness of the sides must be about one-thirtieth of the length of one side of box 1 to give it sufficient stiffness.

An opening (not illustrated) must be provided in one of the corners of box 1 to prevent deformation of the walls of the box resulting from variations in atmospheric pressure. It is clear that this opening is not needed when the box is provided with the blocking means illustrated in FIGS. 3 and 4.

The resolution of this puzzle presents two levels of difficulty. The first consists in arranging the cubes in three layers according to their color after having jumbled them beforehand. The two fixed blue (B) and red (R) cubes numbered "5" indicate the sides where the corresponding colored cubes should appear.

The second level of difficulty consists in putting the blue (B) and red (R) cubes in numerical order. The latter step is the more interesting and definitely the more difficult to achieve. Discovering the logic to be followed is the main attraction of this puzzle.

The fact that the displacement of the mobile cubes is entirely predetermined along the edges of the box gives rise to a very simple method of notation of all the solutions possible so as to pass from one configuration to another. Any change in the order of the cubes is made by moving the empty space along a particular course along the edges of the box. If is sufficient to note the series of corners passed.

Figure 5:
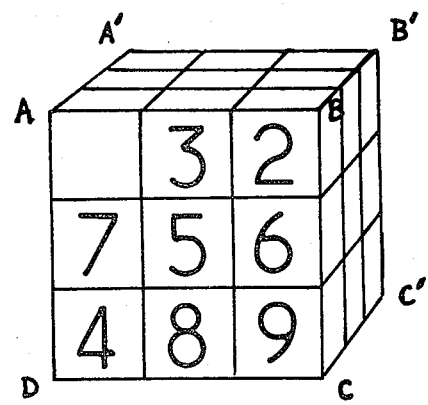
FIG. 5 shows a specific configuration of the cubic elements when the puzzle has been solved and FIG. 6 illustrates another embodiment of the invention.

Let the problem to be solved be represented by FIG. 5: the blue cubes (B) and the yellow cubes (J) are in their right position. Only the position of red cubes (R) "2" and "3" on the one hand and red cubes R "4" and "7" on the other hand need be changed. If the corners of red side (R) of the box are called A, B, C and D, and the corners of the blue side (B) A', B', C' and D', then the sequence of the steps to be played will be represented by the path of the empty space DD'A'B-'BADCBB'A'ABCDAA'D'DA. Hence a theory can be determined that will enable a certain number of typical examples to be solved.

The invention may be generalised in the case in which the box is parallelepipedic. Let the sides expressed by a multiple of the length of the side of a cube be called a,b,c. To limit the possible path the mobile cubes may take to the edges of the box and enable them to be unambiguously displaced by gravity alone, it is necessary to use a certain number of fixed cubes F and a certain number of mobile cubes M given by the formulae:

$$F = abc - 4(a+b+c) + 16$$

$$M = 4(a+b+c) - 17$$

the total number of cubes T being given by the formula:

$$T = abc - 1.$$

The example examined in FIGS. 1 to 5 corresponds to $a=b=c=3$ and gives $F=7$ and $M=19$. This example is particularly interesting as it results in a cubic box $3\times3\times3$, easy to handle, with a central cross easy to make, an acceptable number of mobile cubes and a reasonably difficult problem to be solved.

The case $a=b=4$ and $c=3$ gives $F=20$ and $M=27$ which corresponds to a box measuring $4\times4\times3$ with a dissymetric cross comprising two branches formed by four cubes and four branches formed by two cubes and a central part formed by four cubes.

Figure 6:
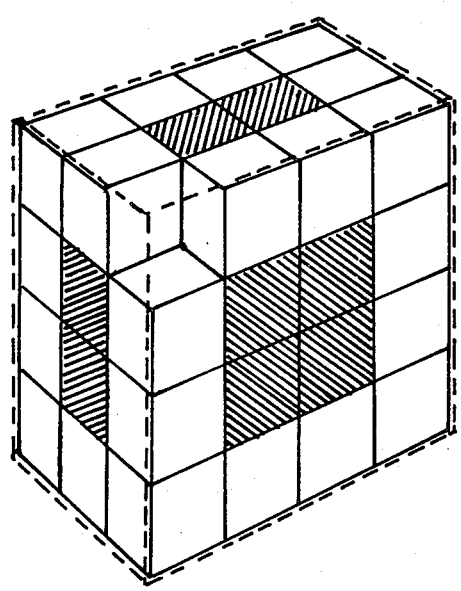

This ccase is illustrated in FIG. 6.

The case $a=b=3$ and $c=2$ gives $F=2$ and $M=15$. The resulting box measuring $3\times3\times2$ only comprises two layers of cubes and the fixed part is reduced to two central cubes which should be immobilised by two centering parts fixed on two opposite walls of the box.

The difficulty encountered in solving the puzzle according to the present invention may be made greater by constructing the following variation; e.g. in the case where the box measures $3\times3\times3$.

The cubes have sides of different colors so that the set of cubes together form a big cube whose six sides are colored as follows, for instance, blue, yellow, red, orange, green and white. Each cube belonging to a corner of the box has three sides of different colors, with two opposite sides of same color. Each cube placed in the middle of an edge of the box has two sides of different colors, with opposite sides of the same color, the last two being black. It will be seen that each cube occupies a unique position within the box. The principle of this puzzle lies in is producing to a big cube in which the color of each side is identical to that of the fixed cube in the center of the side.

A second variation in the embodiment of the invention consists in using cubes with a transparent portion and a colored opaque portion so that the puzzle, once solved, will show an object in its volume form through the transparent portion of the cubes and the walls of the box.

The puzzle covered by the present invention may be used at the first level of difficulty as a child's educational toy, to develop the child's powers of logical reasoning.

At the second level of difficulty, and in particular with the embodiment made of six colors, the puzzle is for adults and may be employed in psycho-technical tests used to determine the logic powers of the person undergoing the test.

The puzzle may also be of use in advertising. The advertised trademark or product may be reproduced on each side or it may be reproduced in volume form inside the cube. In this case the aim would be to reconstitute the trademark or product.

Naturally, the invention is not limited to the embodiments hereabove described or illustrated. In particular, the elements do not have to be cubes. They may be i.e, right-angled parallelepiped, possibly with truncated corners, etc.

What we claim is:

1. A tridimensional puzzle comprising n identical parallelelpipedic elements; and
   a transparent parallelepipedic box whose sides are multiples of those of one element and whose volume is roughly equal to that of n+1 elements, the volume of one element being left vacant in the box thus allowing the displacement of at least some of the elements and the value of the multiples being such that at least two of the n elements do not come into contact with any edge of the box, only the elements located along the edges of the box being free to be moved, the other elements together forming a permanent structure which is deformable because of the loose assembly between its elements, this assembly being obtained by means of a junction with clearance between the control element(s) and the adjacent ones.

2. A tridimensional puzzle comprising, n identical parallelelpipedic elements; and
   a transparent parallelepipedic box whose sides are multiples of those of one element and whose volume is roughly equal to that of n+1 elements, the volume of one element being left vacant in the box thus allowing the displacement of at least some of the elements and the value of the multiples being such that at least two of the n elements do not come into contact with any edge of the box, only the elments located along the edges of the box being free to be moved, the other elements together forming a permanent structure which is deformable because of the loose assembly between its elements, this assembly being obtained by means of a junction with clearance between the control element(s) and the adjacent ones, said junction with clearance comprising projections on the sides of the central element(s) and housings therefor on the sides of the adjacent elements or conversely, projections on the sides of the adjacent elements fitting with sufficient clearance into housings in the sides of said central element(s) to provide a loose assembly.

3. A tridimensional puzzle comprising, n identical parallelelpipedic elements; and
   a transparent parallelepipedic box whose sides are multiples of those of one element and whose volume is roughly equal to that of n+1 elements, the volume of one element being left vacant in the box thus allowing the displacement of at least some of the elements and the value of the multiples being such that at least two of the n elements do not come into contact with any edge of the box, only the elements located along the edges of the box being free to be moved, the other elements together forming a permanent structure which is deformable because of the loose assembly between its elements, this assembly being obtained by means of a junction with clearance between the control element(s) and the adjacent ones, said junction with clearance comprising positioning stubs on the sides of the central element(s) and housings on the sides of the adjacent elements or conversely, stubs on the sides of the adjacent elements fitting with sufficient clearance into housings in the sides of said central element(s) housing to provide a loose assembly.

4. A puzzle according to claim 1, wherein the box is formed by two identical trihedron shaped half boxes whose edges are assembled together by glueing.

5. A puzzle according to claim 2, wherein the box is formed by two identical trihedron shaped half boxes whose edges are assembled by glueing.

6. A puzzle according to claim 3, wherein the box is formed by two identical trihedron shaped half boxes whose edges are assembled together by glueing.

* * * * *